L. A. MANNY.
NUT LOCK.
APPLICATION FILED JAN. 26, 1917.
1,228,940.
Patented June 5, 1917.
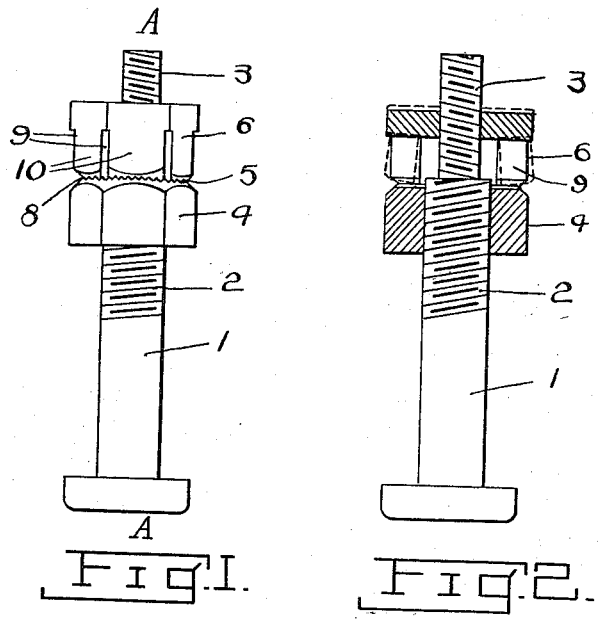
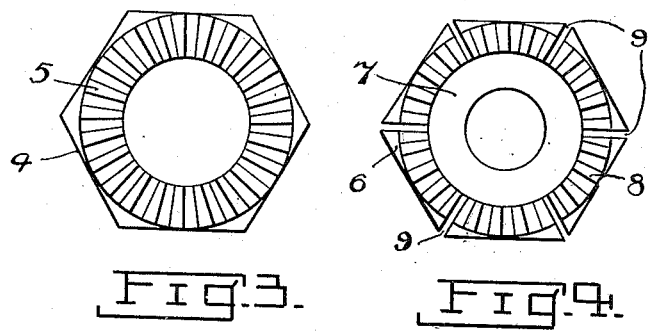
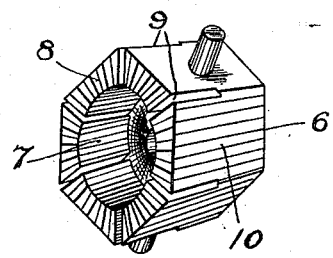
WITNESSES
INVENTOR
L. A. Manny
By
Attorney.

UNITED STATES PATENT OFFICE.

LUCIEN ARMAND MANNY, OF MONTREAL, QUEBEC, CANADA, ASSIGNOR TO CHARLES ISAAC GIROUX, OF MONTREAL, QUEBEC, CANADA.

NUT-LOCK.

1,228,940.      Specification of Letters Patent.      Patented June 5, 1917.

Application filed January 26, 1917. Serial No. 144,759.

*To all whom it may concern:*

Be it known that I, LUCIEN ARMAND MANNY, a subject of the King of Great Britain, and residing at 27 Coté street, in the city of Montreal, in the Province of Quebec, in the Dominion of Canada, have invented certain new and useful Improvements in Nut-Locks; and I do hereby declare that the following is a full, clear, and exact description of the same.

The invention relates to improvements in nut locks, and is designed to provide a simple and efficient form of nut lock which can readily be applied to bolts.

It consists of the peculiar construction of a nut adapted to thread on a bolt whether it has a single thread or one of the type of right-hand and left-hand thread. It is here shown adapted to a bolt having the right-hand thread and left-hand thread.

The nut threading on the right-hand thread is preferably provided, on its outer face, with a series of pointed teeth, while the nut threading on the left-hand thread is provided, on its inner face, with a corresponding number of pointed teeth adapted to register with the teeth of the first-mentioned nut.

The top nut, or the nut that threads on the left-hand thread, as disclosed in the accompanying drawings is provided with an inner circular recess and radial saw cuts at different intervals around said recess in order to give to the toothed outer surface of said recess, which registers with the toothed surface of the nut that threads on the right-hand thread, sufficient resiliency, so that on tightening the outer nut, it will cause same to jam and thereby lock said nuts.

In a modification of the invention, means are provided on the outer nut to screw or unscrew the same, as in certain cases it is not necessary that the lock nut should be tightened with a wrench, and it is claimed that owing to these saw cuts surrounding the inner recess of said top nut, it may be locked with the same efficiency.

In the drawings, Figure 1 is an elevation of a bolt on which the nut lock is adapted.

Fig. 2 is a sectional view through the nut lock on line A—A of Fig. 1, the bolt being shown in elevation.

Fig. 3 is a plan view of the toothed surface of the lower or inner nut.

Fig. 4 is a plan view of the toothed surface of the top nut, showing the inner recess and radial saw cuts.

Fig. 5 is a perspective view of a modification of the top nut, showing means thereon to unscrew or screw same.

Like numerals of reference indicate corresponding parts in each figure.

In the drawings, 1 is a bolt, being here shown as being provided with a right thread 2 and a left thread 3, and 4 is the nut adapted to thread on the right thread 2, said nut being provided on its outer surface with pointed radial teeth 5. 6 is the top nut, preferably of the same size as nut 4, and provided on its inner face with a circular recess 7 whose diameter is appreciably greater than that of the adjacent portion of the bolt, the surface surrounding the said recess being provided with radial teeth 8 adapted to engage the teeth 5 on the nut 4.

9 are radial saw cuts through the edge surrounding the said recess 7 and projecting to the bottom of said recess, in order to provide a series of wing-like members 10 having sufficient resiliency to cause the teeth 8 on their free ends to jam tightly in the teeth 5 of the nut 4.

The recess 7 in the nut 6 will slightly weaken that portion of the nut which threads on the left-hand thread 3, and, together with the saw cuts 9 through the edge of the recess 7, will cause the members 10 to spread slightly outward, as shown in dotted lines in Fig. 2 of the drawings.

What I claim is:—

The combination, with a bolt; of a pair of coöperating nuts threaded thereon and having their confronting inner faces formed with circular series of radial teeth, the teeth of both series being disposed in planes at right angles to the axes of the nuts, and the teeth of one series adapted to directly register with those of the other series; the outer nut having its inner face provided with a central recess of greater diameter than the adjacent portion of the bolt, and also having a radial cut at each corner, said cuts intersecting the series of teeth on said nut and extending inwardly through said inner face to the bottom of said recess and opening at opposite ends through the side walls of the recess and the nut so as to form a series of resilient members which are adapted to spread laterally when the two nuts are tightened together, thereby to cause the teeth on the free ends of said members to jam tightly into the teeth of the inner nut.

Signed at Montreal, Quebec Canada, this nineteenth day of December 1916.

LUCIEN ARMAND MANNY.

Witnesses:
F. A. BEST,
A. P. DEAL.

Copies of this patent may be obtained for five cents each, by addressing the "Commissioner of Patents, Washington, D. C."